2,759,789

URANIUM PRODUCTS AND METHODS OF USING

Louis Spiegler, Woodbury, N. J., assignor to the United States of America as represented by the United States Atomic Energy Commission No Drawing. Application November 8, 1944, Serial No. 562,563

9 Claims. (Cl. 23—14.5)

This invention relates to the production of novel uranium compounds. It is particularly concerned with the production of octavalent uranium in soluble form.

In the past the production of octavalent uranium compounds such as uranium peroxide has been described. In my U. S. patent application Serial No. 559,665 filed October 20, 1944 and entitled Separation of Uranium from Mixtures, I have described the production of uranium peroxide from uranyl sulfate solutions. The process provides a suitable method for separation of uranium from other metals and non-metallic impurities. Under certain circumstances the products may be contaminated with metallic fluorides.

The present invention has for its objects the production of new octavalent uranium compounds and particularly the preparation of soluble uranium compounds from uranium peroxide under such conditions that impurities present in the uranium peroxide remain undissolved and can be separated from the aqueous solutions of the products by decantation or filtration. A further object of the invention is the utilization of the novel uranium compounds in a new method for purifying the uranium and recovering uranium peroxide free from alkali-soluble impurities such as fluorides. Further objects will be apparent from the following description.

The new compounds of the present invention are mixed alkali uranium carbonates in which the uranium is present in octavalent form.

The new compounds may be prepared from uranium peroxide by reaction with aqueous alkali carbonate solutions whose hydrogen ion concentrations correspond to pH values between about 7.6 and about 10.5. The products also can be prepared from solutions of uranyl alkali carbonates by treatment with peroxides under such conditions that the hydrogen ion concentrations at completion of the reaction correspond to pH values within the limits stated. In carrying out either process, the presence of substantial quantities of materials which catalyze the decomposition of peroxides should be avoided. Thus materials such as iron and vanadium either should be absent or, if present, should constitute very small proportions of the mixture. For example, it is desirable to avoid the presence of more than 500 parts per million of iron in the solution and to avoid weight ratios of vanadium to uranium greater than 0.01.

In the conversion of uranium peroxide to the carbonate products of the invention, elevated temperatures have been found to be desirable in order to accelerate the reaction. At 60° C. the reaction requires four times as long for completion as at 70° C. and at temperatures below 60° C. still longer times are require. On the other hand, the temperature should be maintained below that at which substantial decomposition of peroxide occurs. This decomposition becomes noticeable at about 90° C.

The hydrogen ion concentration has a definite effect upon the reaction of uranium peroxide with alkali carbonate solutions. At pH values below about 7.6 the peroxide is not dissolved. At pH values above about 10.8 an alkaline product is formed which is quite insoluble and therefore is precipitated from solution.

While I do not wish to be limited to any particular theory of reaction, I believe that at a pH value of about 7.6 the soluble product is a compound of the molecular formula $UO_2(AlkCO_3)_4$, whereas at a pH value of about 10.5 the soluble product is a compound of the molecular formula $UO_2(AlkCO_3)_3OAlk$, Alk representing the alkali, and between these two values the products comprise mixtures of these two soluble compounds in proportions varying more or less uniformly from 100% of the tetracarbonate to 100% of the tricarbonate. The water-insoluble products formed at pH values above about 10.8 are believed to have a similar constitution but with a lower proportion of the carbonate and higher proportion of alkali. Thus the new compounds may be represented by the general formula $$UO_2(AlkCO_3)_x(OAlk)_{4-x}$$

wherein $x$ represents a positive integer not greater than 4. When $x$ is 3 or 4 the products are water-soluble.

The alkali carbonates employed to produce the new products of the present invention are carbonates of alkali-metals and ammonium and the term "alkali" as used herein and in the appended claims designates the entire group of alkali-metals and ammonium.

Suitable solutions for effecting the conversion of uranium peroxide to the water-soluble products are aqueous solutions of the bicarbonate or mixtures of the bicarbonate and carbonate of one or more of the desired alkalies, in an amount corresponding to 4 atoms of the alkali-metal or ammonium for each atom of uranium present. In plant operations a small excess of the carbonate may be provided to avoid the accuracy of control necessary to supply exactly stoichiometric proportions. For example a 2% or 3% excess will normally be convenient. However if quantities are accurately measured, four mols of sodium bicarbonate or one mol of sodium carbonate and 2 mols of sodium bicarbonate will produce the desired products from one mol of uranium peroxide.

In utilization of products of the invention to eliminate undesired impurities, the alkali carbonate should be selected with the nature of the impurity in mind. The invention has been found to be particularly valuable in providing methods for removing fluorides associated with uranium peroxide obtained from materials containing both magnesium and fluorine. For effecting this separation the production of carbonate salts of sodium is especially suitable. The solubility of the sodium carbonate salts of octavalent uranium is considerably greater than the sodium carbonate salts of hexavalent uranium and consequently relatively concentrated aqueous solutions may be employed. By dissolving uranium peroxide in a sodium bicarbonate or sodium carbonate bicarbonate solution the uranium may be completely dissolved while fluoride remains in or is converted to insoluble form and can be removed by sedimentation or filtration processes.

After removal of insoluble impurities from the solution, the uranium may be precipitated either by increasing or decreasing the alkalinity of the solution. I prefer to render the solution slightly acid, whereby uranium peroxide is reprecipitated. Completeness of precipitation of the uranium peroxide depends upon the hydrogen ion concentration and degree of oxidation. To effect precipitation of the uranium as the peroxide, a pH value between 2 and 5 and a small excess of hydrogen peroxide are desirable.

I prefer to carry out the process of the invention by mixing uranium peroxide with between 10 and 20 times its weight of an aqueous solution of a carbonate of sodium having a pH between 8.5 and 9.0, providing from 4 to 5 atoms of sodium per atom of uranium, and maintained at a temperature between 65° C. and 75° C. When substantially all of the uranium has dissolved, the solution may be filtered to remove insoluble impurities. If any uranium remains undissolved, it is collected with the filter residue and can be washed from the residue by means of fresh sodium bicarbonate solution, which can then be employed for dissolving a succeeding batch of uranium peroxide.

The uranium sodium carbonate solutions prepared by the process of the invention are clear solutions having a red color the depth of which depends upon the alkalinity of the solution; the more alkaline the solution, the deeper red is the color.

In order to precipitate the uranium completely as uranium peroxide, I prefer to mix the solution with sufficient acid to provide a final pH between 2.5 and 3.5 and maintained at a temperature between 30° C. and 65° C. during the mixing. The acidification may be effected by adding an acid to the alkaline solution but a more uniform evolution of carbon dioxide is obtained by adding the alkaline solution to the acid, or by adding both the alkaline solution and acid simultaneously to a heel of aqueous liquid of the desired pH. Any appropriate mineral acid may be employed for the acidification; for example, hydrochloric acid, nitric acid, or sulfuric acid, especially the last, can be used to advantage.

The presence of dissolved uranium in the mother liquor may be determined by testing a small portion of the solution with potassium ferrocyanide. A red or yellow coloration indicates the presence of uranium in solution. If after the acidification, the test shows uranium in solution, hydrogen peroxide is added to complete the precipitation.

The following examples further illustrate the invention. (Where not otherwise indicated proportions are expressed in terms of weight.)

*Example 1*

100 grams of uranium peroxide filter cake, containing 60% $UO_4.2H_2O$, 0.6% fluorine (present as magnesium-uranium-fluoride), and the remainder adhering moisture, was mixed with 70 grams of sodium bicarbonate and 800 grams of water at 60° C. for 30 minutes. The pH of the solution was 8.3. At the end of this heating period the solid had partially dissolved. The temperature was raised to 70° C. and the solution was maintained for 30 minutes at this temperature. The pH of the solution was now 8.8 and the solid material was substantially completely dissolved forming an orange solution. The solution was filtered and 945 cc. of filtrate was recovered. 895 cc. of this filtrate was heated to a temperature between 40° and 45° C. and 29 cc. of 96% $H_2SO_4$ solution was added bringing the pH of the solution to 2.0. 19 cc. of aqueous hydrogen peroxide solution containing 28% $H_2O_2$, and 30 cc. of aqueous sodium hydroxide solution containing 30% NaOH were added bringing the final pH of the solution to 3.0. The precipitated uranium peroxide was separated by filtration and washed with water. 65 grams of dry uranium peroxide was obtained containing 0.15% fluorine.

*Example 2*

50 grams of wet uranium peroxide containing 67.6% $UO_4.2H_2O$ was mixed with 10.6 grams of sodium carbonate, 16.8 grams of sodium bicarbonate and about 350 cc. of water for about 40 minutes at 70° C. The solid peroxide dissolved to form an orange solution having a pH of 8.2. To the clear solution, powdered sodium carbonate was added until the pH rose to 9.2. The solution remained clear but its color deepened. 5 grams of epsom salt was added and the solution was allowed to stand overnight. It was then filtered. The aqueous filtrate containing the uranium sodium carbonate compound was analyzed and found to contain 0.02% fluorine. The filter residue, having a dry weight of 0.8 gram, contained 28.7% fluorine.

*Example 3*

A uranium peroxide product had the composition: uranium peroxide 56.7%, fluorine 0.9%, sulfate 0.6%, water about 42%. A 116 gram portion of this product was added to a sodium bicarbonate solution composed of 70 grams of sodium bicarbonate in one liter of water at 70° C. The pH value of the solution was 8.6. 10 grams of Filtercel was added; the solution was maintained at 70° C. for 20 minutes longer and then filtered. After removing 100 cc. of the solution for analysis, the filtrate was added gradually to 100 cc. of acidic water at 50° C. The pH of the mixture was maintained slightly below 3 by adding aqueous 50% sulfuric acid at frequent intervals. The total amount of sulfuric acid employed was 75 cc. and the final pH of the solution was 2. The solution was cooled to 40–45° C. and 16 cc. of 28% $H_2O_2$ solution was added. The resulting pH was 1.6 and 32 cc. of aqueous 30% NaOH solution was added to adjust the pH to 2.7. After one hour the solution was filtered. The filter cake was washed with water until a negative sulfate test was obtained on the wash water and then dried. The dry filter residue weighed 57 grams and contained 0.05% of fluorine.

It will be understood that I intend to include variations and modifications of the invention and that the preceding examples are illustrations only and in no wise to be construed as limitations upon the invention, the scope of which is defined in the appended claims, wherein

I claim:

1. The method of converting uranium peroxide to a water-soluble uranium product, which comprises reacting the uranium peroxide with an aqueous alkali-carbonate solution at a pH between 7.6 and 10.8.

2. The method of converting uranium peroxide to a water-soluble uranium product, which comprises heating the uranium peroxide with an aqueous sodium carbonate solution at a pH between 7.6 and 10.8 at a temperature between 60° C. and 90° C.

3. The method of converting uranium peroxide to a water-soluble uranium product, which comprises heating the uranium peroxide with an aqueous sodium carbonate solution at a pH between 8.5 and 9.0 at a temperature between 65° C. and 75° C.

4. The method of purifying uranium peroxide, which comprises dissolving the uranium peroxide in an aqueous alkali carbonate solution at a pH between 7.6 and 10.8, separating undissolved metal fluorides from the solution, and then acidifying the solution to an acid pH to precipitate uranium peroxide.

5. The method of purifying uranium peroxide containing a metal fluoride impurity, which comprises dissolving the uranium peroxide in an aqueous sodium carbonate solution at a pH between 7.6 and 10.8, separating undissolved metal fluoride from the solution, and then acidifying the solution to a pH between 2 and 5 to precipitate uranium peroxide.

6. The method of purifying uranium peroxide, which comprises dissolving the uranium peroxide at a temperature between 60° C. and 90° C. in an aqueous sodium carbonate solution having a pH between 7.6 and 10.8 and containing between 4 and 5 atoms of sodium for each atom of uranium added, separating undissolved metal fluorides from the solution, acidifying the solution to a pH between 2 and 5 at a temperature between 30° C. and 65° C. to precipitate uranium peroxide, and separating the uranium peroxide from the solution.

7. The method of purifying uranium peroxide, which comprises dissolving the uranium peroxide in an aqueous alkali carbonate solution at a pH between 7.6 and 10.8, separating undissolved metal fluorides from the solution, and then acidifying the solution gradually to a pH between 2 and 5 at a temperature between 30° and 65° C. to precipitate uranium peroxide.

8. The method of purifying uranium peroxide containing a metal fluoride impurity, which comprises dissolving the uranium peroxide in an aqueous sodium carbonate solution at a pH between 7.6 and 10.8, separating undissolved metal fluoride from the solution and then acidifying the solution gradually to a pH between 2 and 5 at a temperature between 30° and 65° C. to precipitate uranium peroxide.

9. The method of purifying uranium peroxide, which comprises dissolving the uranium peroxide at a temperature between 60° C. and 90° C. in an aqueous sodium carbonate solution having a pH between 7.6 and 10.8 and containing between 4 and 5 atoms of sodium for each atom of uranium added, separating undissolved magnesium fluoride from the solution, and then acidifying the solution gradually to a pH between 2 and 5 at a temperature between 30° and 65° C. to precipitate uranium peroxide.

References Cited in the file of this patent

Friend, Textbook of Inorganic Chemistry, vol. 7, part 3, pp. 311–313 (1926), published by Charles Griffin and Co., Ltd., London.